(12) United States Patent
Fitzgerald et al.

(10) Patent No.: US 10,931,761 B2
(45) Date of Patent: Feb. 23, 2021

(54) INTERCONNECTING NODES OF ENTITY COMBINATIONS

(71) Applicant: Microsoft Technology Licensing, LLC, Redmond, WA (US)

(72) Inventors: Jeffrey David Fitzgerald, Redmond, WA (US); Valentine Ngwabo Fontama, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 549 days.

(21) Appl. No.: 15/430,283

(22) Filed: Feb. 10, 2017

(65) Prior Publication Data
US 2018/0234305 A1     Aug. 16, 2018

(51) Int. Cl.
*H04L 29/08* (2006.01)
*H04L 12/24* (2006.01)
*H04L 29/06* (2006.01)

(52) U.S. Cl.
CPC ............. *H04L 67/16* (2013.01); *H04L 41/12* (2013.01); *H04L 69/22* (2013.01)

(58) Field of Classification Search
CPC .......... H04L 67/16; H04L 41/12; H04L 69/22
USPC ....................................................... 709/220
See application file for complete search history.

(56) References Cited

U.S. PATENT DOCUMENTS

| 6,633,544 | B1 | 10/2003 | Rexford et al. |
| 8,781,231 | B1 * | 7/2014 | Kumar .................... G06F 16/54 |
| | | | 382/190 |
| 8,819,206 | B2 | 8/2014 | Bandi et al. |
| 8,880,558 | B2 | 11/2014 | Deng et al. |
| 8,903,061 | B2 | 12/2014 | Evans et al. |
| 9,104,728 | B2 | 8/2015 | Ngai et al. |
| 9,329,837 | B2 * | 5/2016 | Muntes ..................... G06F 8/70 |

(Continued)

FOREIGN PATENT DOCUMENTS

| WO | 2015191352 A1 | 12/2015 | |
| WO | WO-2015191352 A1 * | 12/2015 | ........... H04L 67/327 |

OTHER PUBLICATIONS

Bruni, et al., "A Graph Syntax for Processes and Services", In Proceedings of the 6th international conference on Web services and formal methods, Sep. 4, 2009, 15 pages.

*Primary Examiner* — Mohamed A. Wasel
*Assistant Examiner* — Patrick F Ngankam
(74) *Attorney, Agent, or Firm* — Workman Nydegger

(57) ABSTRACT

A graph of combinations of entities and parameters corresponding to the combinations of entities may be stored as two tables. The first table may comprise a table that includes all entity combinations, as well as each parameter that corresponds to the entity combinations. Each entity combination may additionally be parseable, such that each entity combination may be parsed to allow for identification of each entity included within a given entity combination. The second table may include an entity combination node corresponding to (and linked to) each entity combination stored within the first table. Each given entity combination node of the second table may then be linked within the second table to each nearest neighbor node of the given node to thereby allow for identifying each entity combination within the first table that includes a particular relevant entity (or set of entities).

20 Claims, 6 Drawing Sheets

(56) References Cited

U.S. PATENT DOCUMENTS

2009/0164895 A1\* 6/2009 Baeza-Yates ....... G06F 16/9535
715/700
2013/0097183 A1 4/2013 Mccracken
2014/0250489 A1 9/2014 Calo et al.
2015/0149484 A1 5/2015 Kelley
2015/0381515 A1 12/2015 Mattson et al.

\* cited by examiner

| Entity Combinations | Parameter 1 | Parameter 2 | Parameter 3 |
|---|---|---|---|
| A | Value 1 | Value 7 | Value 13 |
| A, B | Value 2 | Value 8 | Value 14 |
| A, C | Value 3 | Value 9 | Value 15 |
| B, C | Value 4 | Value 10 | Value 16 |
| A, B, C | Value 5 | Value 11 | Value 17 |
| A, B, C, D | Value 6 | Value 12 | Value 18 |

Figure 3

| Service Combinations | Trial ConversionRate | Upgrade Rate | Churn Rate |
|---|---|---|---|
| Virtual Machines | 5% | 2% | 3% |
| Virtual Machines, Storage | 3% | 8% | 1% |
| Virtual Machines, Backup | 7% | 9% | 15% |
| Storage, Backup | 4% | 3% | 7% |
| Virtual Machines, Storage, Backup | 1% | 4% | 1% |
| Virtual Machines, Storage, Backup, Virtual Network | 10% | 5% | 9% |

*Figure 4*

INTERCONNECTING NODES OF ENTITY COMBINATIONS

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

For instance, there has been an increasing transition, with respect to both hardware and software, from on-premises to cloud based solutions. Enormous amounts of data relating to such cloud-based solutions are generated, transferred, and shared each minute of each day. Accordingly, data relating to computer systems and computer services within such complex, distributed environments can therefore be difficult to monitor and analyze. Oftentimes, such data is stored in large, sparse matrices, graph databases, and so forth. These large, sparse matrices, graph databases, and so forth suffer from numerous problems including scalability, inefficient storage, and difficulty in traversing or searching for particular data. For instance, with respect to inefficient storage, these matrices and databases may necessitate enormous storage requirements, while only including sparse data throughout.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to generating a graph of interconnected nodes. For example, embodiments may include identifying a plurality of combinations of one or more entities. Embodiments may further include representing each of the plurality of entity combinations as a node within the graph. Embodiments may further include identifying one or more nearest neighbor nodes for at least one of the nodes. Each nearest neighbor node of a particular node comprises a node that includes at least one entity that is common between the particular node and the nearest neighbor node. Embodiments may further include formulating the graph by linking the at least one node with at least one of the one or more identified nearest neighbor nodes of the at least one node.

In this way, each entity combination may be stored as any appropriate data type (e.g., a string, a vector, and so forth) of parseable entity combinations such that entities within a given entity combination can be parsed and individually identified. Storing each entity combination in such a manner may allow for using only one column that includes each entity combination rather than potentially hundreds of columns required to include every service/combination. Additionally, only entity combinations that are used in practice may be stored such that combinations that are possible, but don't exist in practice, are not stored (e.g., if entity combination "A, B" is possible, but is not actually used, the combination "A, B" is not stored in the table).

Furthermore, by using a directed acyclic graph as described herein, once an entity combination that includes at least the particular entity has been parsed and identified, nearest neighbor nodes of the identified entity combination node may be used to identify all other entity combinations that include at least the particular entity. Notably, parsing of entity combinations may begin at the simplest entity combinations (i.e., the entity combinations having the fewest entities) in order to quickly identify a relevant entity or entity combination (e.g., the entity or entities regarding which a user has requested information), which can then be used with respect to the directed acyclic graph to identify nearest neighbor nodes and ultimately all entity combinations that include a relevant entity or combination of entities.

As such, regardless of the way in which the two tables or graphs (i.e., both the table of entity combinations and corresponding parameters e.g., the table 300, as well as the table that links nodes of entity combinations e.g., the directed acyclic graph 500) are implemented, linking nodes of entity combinations (e.g., as illustrated in FIGS. 5 and 6) may allow tables/graphs of entity combinations and corresponding parameters (e.g., as illustrated in FIGS. 3 and 4) to be parsed, traversed, and filtered both quickly and efficiently. Furthermore, implementing such a directed acyclic graph (e.g., the graph 500 and the table 600) may greatly improve the speed and efficiency with which a table of entity combinations and parameters (e.g., the table 300 and the table 400) is traversed, parsed, and filtered, regardless of the size of the table of entity combinations and corresponding parameters.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an exemplary table for storing parseable combinations of entities.

FIG. 4 illustrates another exemplary table for storing parseable combinations of entities.

DETAILED DESCRIPTION

At least some embodiments described herein relate to generating a graph of interconnected nodes. For example, embodiments may include identifying a plurality of combinations of one or more entities. Embodiments may further include representing each of the plurality of entity combinations as a node within the graph. Embodiments may further include identifying one or more nearest neighbor nodes for at least one of the nodes. Each nearest neighbor node of a particular node comprises a node that includes at least one entity that is common between the particular node and the nearest neighbor node. Embodiments may further include formulating the graph by linking the at least one node with at least one of the one or more identified nearest neighbor nodes of the at least one node.

In this way, each entity combination may be stored as any appropriate data type (e.g., a string, a vector, and so forth) of parseable entity combinations such that entities within a given entity combination can be parsed and individually identified. Storing each entity combination in such a manner may allow for using only one column that includes each entity combination rather than potentially hundreds of columns required to include every service/combination. Additionally, only entity combinations that are used in practice may be stored such that combinations that are possible, but don't exist in practice, are not stored (e.g., if entity combination "A, B" is possible, but is not actually used, the combination "A, B" is not stored in the table).

Furthermore, by using a directed acyclic graph as described herein, once an entity combination that includes at least the particular entity has been parsed and identified, nearest neighbor nodes of the identified entity combination node may be used to identify all other entity combinations that include at least the particular entity. Notably, parsing of entity combinations may begin at the simplest entity combinations (i.e., the entity combinations having the fewest entities) in order to quickly identify a relevant entity or entity combination (e.g., the entity or entities regarding which a user has requested information), which can then be used with respect to the directed acyclic graph to identify nearest neighbor nodes and ultimately all entity combinations that include a relevant entity or combination of entities.

Figure 5:
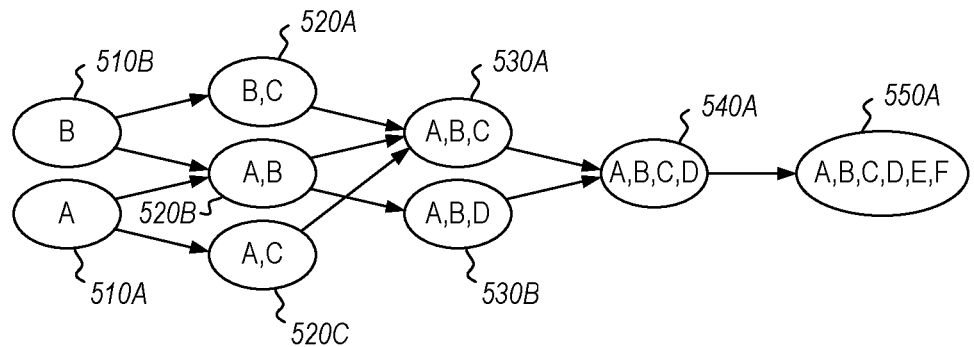
FIG. 5 illustrates a directed acyclic graph that facilitates operation of the principles described herein.
Figure 6:
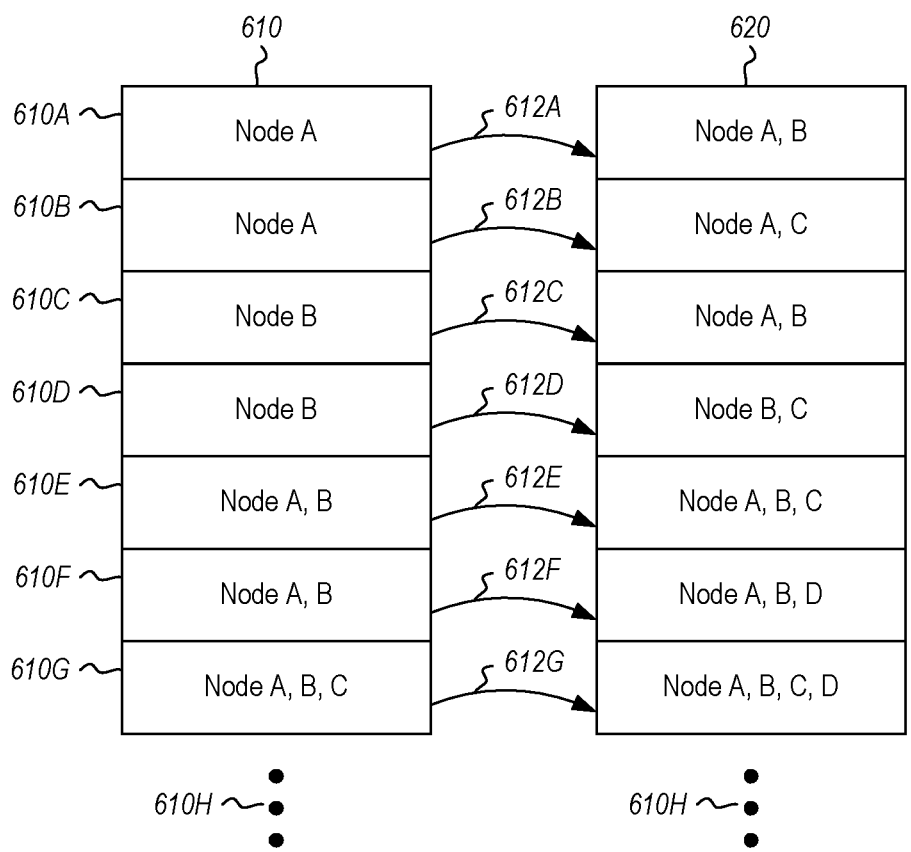
FIG. 6 illustrates an exemplary table that comprises a directed acyclic graph.

As such, regardless of the way in which the two tables or graphs (i.e., both the table of entity combinations and corresponding parameters—e.g., the table 300, as well as the table that links nodes of entity combinations—e.g., the directed acyclic graph 500) are implemented, linking nodes of entity combinations (e.g., as illustrated in FIGS. 5 and 6) may allow tables/graphs of entity combinations and corresponding parameters (e.g., as illustrated in FIGS. 3 and 4) to be parsed, traversed, and filtered both quickly and efficiently. Furthermore, implementing such a directed acyclic graph (e.g., the graph 500 and the table 600) may greatly improve the speed and efficiency with which a table of entity combinations and parameters (e.g., the table 300 and the table 400) is traversed, parsed, and filtered, regardless of the size of the table of entity combinations and corresponding parameters.

Some introductory discussion of a computing system will be described with respect to FIG. 1. Then generating a graph of interconnected nodes will be described with respect to FIGS. 2 through 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
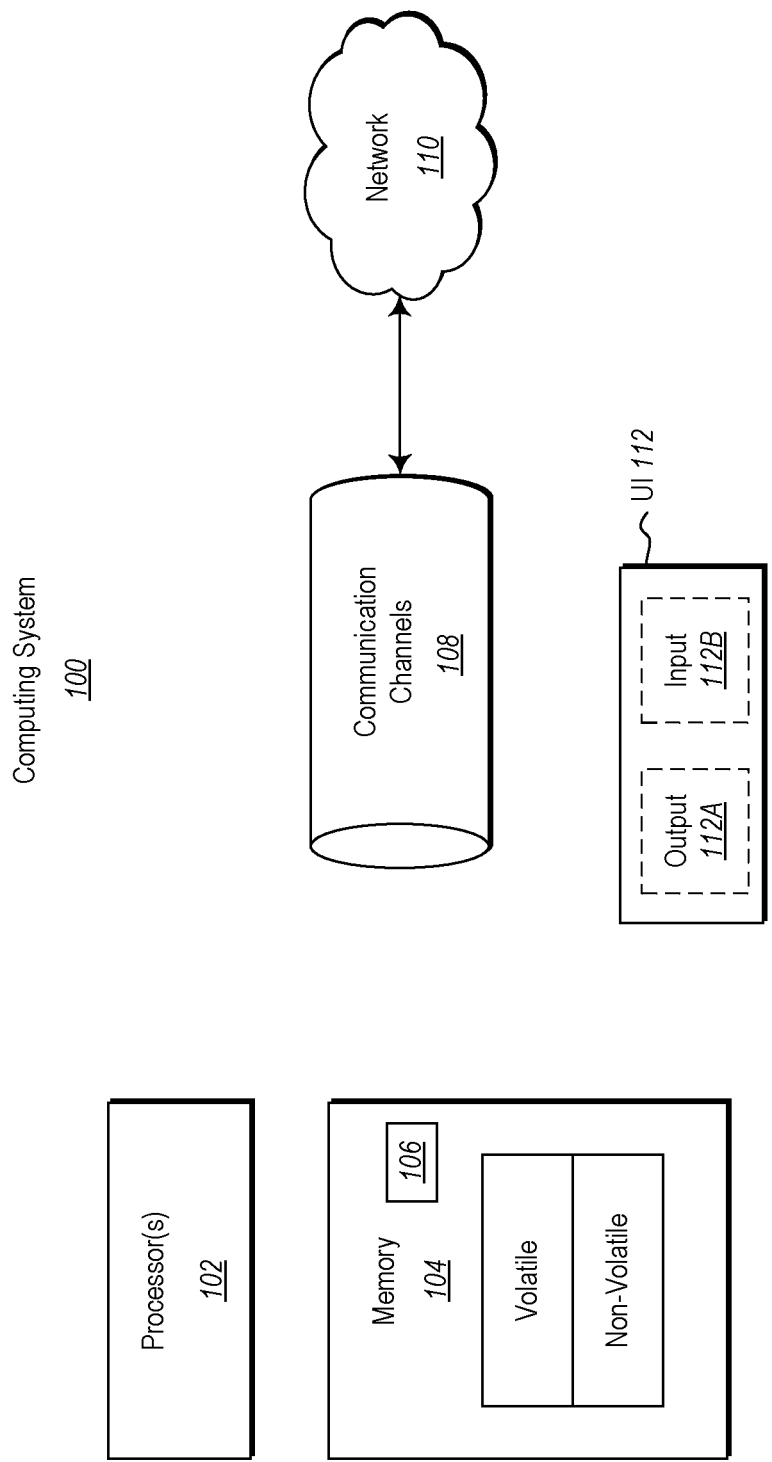
FIG. 1 illustrates an example computer architecture that facilitates operation of the principles described herein.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
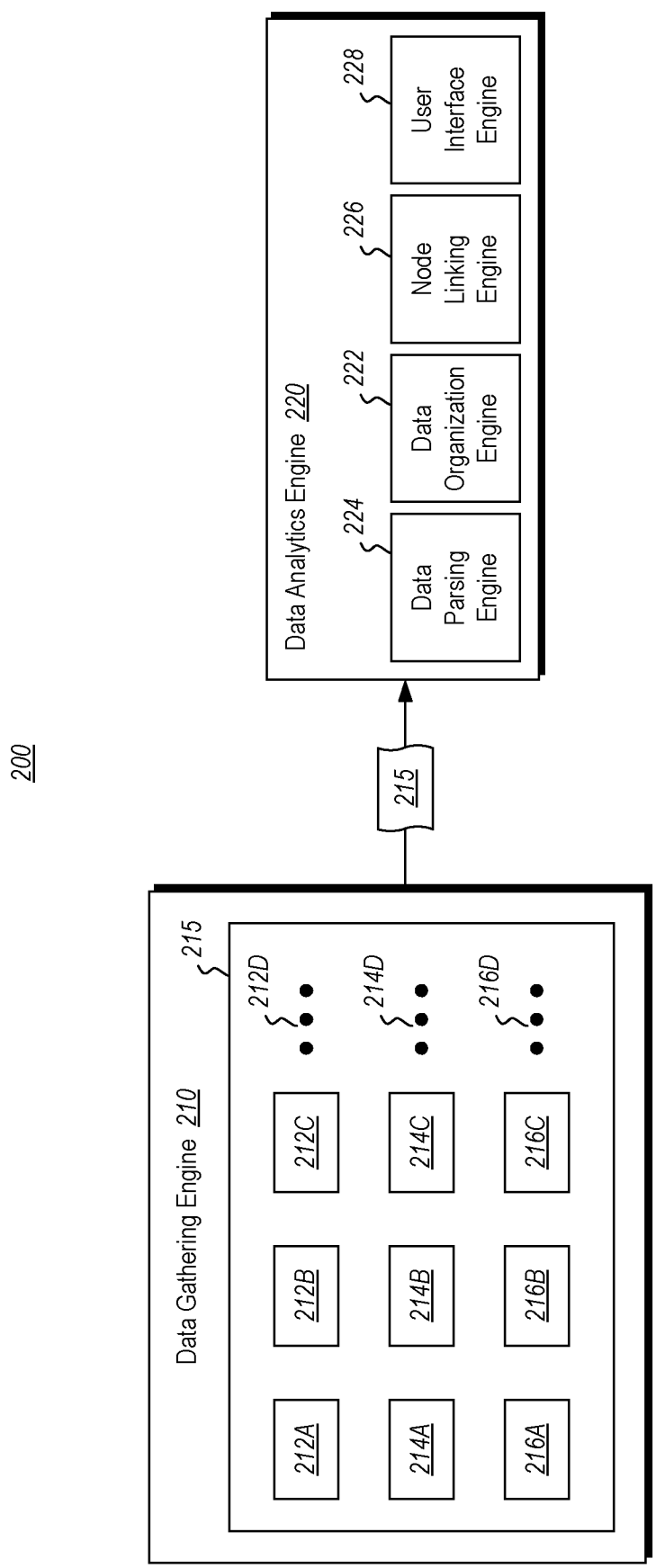
FIG. 2 illustrates an example environment for generating a graph of interconnected nodes.

FIG. 2 illustrates a computer system 200 for generating a graph of nodes that comprise parseable entity combinations. The computer system 200 may correspond to the computer system 100, as described with respect to FIG. 1. As illustrated, the computer system 200 includes various engines and/or functional blocks that may be used to generate a graph of nodes that comprise parseable entity combinations, as further described herein. The various engines and/or functional blocks of computer system 200 may be implemented on a local computer system or may be implemented on a distributed computer system that includes elements resident in the cloud or that implement aspects of cloud computing. The various engines and/or functional blocks of the computer system 200 may be implemented as software, hardware, or a combination of software and hardware. Notably, the computer system 200 may include more or less than the engines illustrated in FIG. 2. Additionally, some of the engines may be combined as circumstances warrant. Although not illustrated, the various engines of the computer system 200 may access and/or utilize a processor and memory, such as the processor 102 and the memory 104 of FIG. 1, as needed to perform their various functions.

As illustrated in FIG. 2, the computer system 220 includes a data gathering engine 210. The data gathering engine 210 may receive and/or access data 215 from one or more sources that may be internal or external to the computer system 200. In an example, the data gathering engine 210 may access and/or receive the data 215 from a database that is designed to store the data 215. In another example, the data gathering engine 210 may access and/or receive data from one or more individual computer systems that are external to computer system 200. In yet another example, the data gathering engine may access and/or receive data from a cloud computing service.

The data 215 may be any type of data. For instance, the data 215 may comprise cloud computer service data. More specifically, the data 215 may comprise data relating to cloud computer services offered for use and subscription (e.g., services offered through MICROSOFT® AZURE®, AMAZON WEB SERVICES®, and so forth). In another example, the data 215 may be telemetry data. Such telemetry data may be collected from a large number of external computer systems or devices for further analysis related to operation and/or composition of the external computer systems from which the data was gathered. While cloud computer service data and telemetry data are used as particular examples herein, these examples are illustrative only and not meant to limit the invention. As such, any type of data may be gathered by the data gathering engine 210 and used to practice the principles described herein.

Regardless of the type of data gathered, the data gathering engine 210 may identify entities 212, combinations of entities 214, and parameters 216 associated with the entities, as further described herein. While only three entities 212 (i.e., entities 212A through 212C), three entity combinations 214 (214A through 214C), and three parameters 216 (216A through 216C) are shown in FIG. 2, ellipses 212D, 214D, 216D represent that there may be any number of entities 212, entity combinations 214, and parameters 216. Entities 212 may comprise any form of data that can be combined with other similar types of data to form entity combinations, but that are also separately identifiable within an entity combination. For instance, using the cloud computer service example, entities 212 identified by the data gathering service may comprise services offered by the cloud computer service. In an example, a cloud computer service may offer services including storage, backup, virtual machines, virtual network(s), machine learning, databases, and so forth.

Using the telemetry data example, entities identified by the data gathering module may comprise computer hardware and/or software components of the external computer system from (or about) which the telemetry data was gathered. For instance, such components may include a device type, a model type, an operating system type, a processor type, a memory type, a memory size, application version information, operating system version information, firmware version, display type, display size, storage size, storage type, and so forth.

Additionally, using the telemetry data example, identified entities 212 may include particular states of the external computer from (or about) which the telemetry data was gathered. For instance, such states may include a level of screen brightness, whether Wi-Fi™ is enabled, whether BLUETOOTH® is enabled, whether a display is on or in a standby state, whether a battery saver mode is being employed, whether a user is present at the computer system, a current power source of the computer system (e.g., battery), geographical information (e.g., where the computer system is being used), a power mode of the computer system, a date and time associated with when these states and/or parameters associated with entity combinations occurred (i.e., time stamp), events or instances of a specific operation, particular running applications, and so forth battery saver and so forth.

Once the entities 212 have been identified, regardless of entity type, entity combinations 214 of one or more entities and one or more parameters 216 that correspond to those entity combinations may also be identified. For instance, using the cloud computer service example, the data gathering engine may identify each combination of cloud computer services offered. In a more specific example, the data gathering engine may identify a virtual machine combination, a virtual machine and storage combination, a virtual machine, storage, and backup combination, and so forth. In some embodiments, the data gathering engine may limit the identification of combinations of services to combinations of services that have been identified as being used together in practice rather than identifying every possible combination of services (i.e., only combinations of services actually in use or previously in use may be identified).

Using the telemetry data example, the data gathering engine may identify each combination of external computer system components and/or states. In a more specific example, the data gathering engine may identify various combinations of at least one of a device having a particular type of processor, a particular type of operating system, whether BLUETOOTH was on or off, whether Wi-Fi was on or off, and so forth. In some embodiments, the data gathering engine may limit the identification of combinations of components and states to combinations that have been identified as being used together in practice rather than identifying every possible combination of components and states, as further described herein.

Once the entity combinations 214 (e.g., cloud computer services, components and states of external computer systems, and so forth) have been identified, the data gathering engine may identify parameters 216 that are associated with the identified entity combinations 214. The parameters 216 may give further details regarding the entity combinations 214. For instance, the parameters 216 may be metrics associated with the entity combinations, metadata associated with the entity combinations, and so forth. For instance, using the cloud computer services example, identified parameters 216 may include specific information associated with the identified combinations of services. For instance, parameters associated with combinations of cloud services may include popularity, weekly usage, upgrade rate (i.e., combinations that lead to using additional different services), weekly usage per subscription, churn rate (i.e., entity combinations that were being used for a particular time period and then were suddenly dropped from usage), trial conversion rate, and so forth. Using the telemetry data example, identified parameters may include specific information about the identified combinations of components and states of the particular external computer systems from (or about) which the data was gathered. For example, parameters associated with the telemetry data may include central processing unit (CPU) usage, error codes, battery usage, battery charge rate, battery drain rate, energy consumption, resource usage, and so forth.

While particular entities 212, entity combinations 214, and parameters 216 are described herein, any number of different types of entities, entity combinations, and parameters may be utilized. As such, the embodiments disclosed herein are not limited by the types of entities, entity combinations, and parameters that are identified as being associated with the data 215. Accordingly, the embodiments and the claims disclosed herein are not limited by the types of the data 215 and the corresponding entities, entity combinations, and parameters.

As illustrated, the computer system 200 of FIG. 2 may also include a data analytics engine 220 that is configured to analyze, organize, and present the data 215 in any number of ways using a data organization engine 222, a data parsing engine 224, a node linking engine 226, and a user interface engine 228. As briefly described, the data analytics engine may include a data organization engine 222. The data organization engine 222 may organize the data 215 into one or more tables, as shown in FIGS. 3 through 6. As shown in FIG. 3, the data organization engine may organize the data 215 into a table that comprises storing each entity combination (of one or more entities) in a single column 310 of the table 300, along with a single column for each parameter (i.e., parameter 312 through parameter 316) associated with the entity combinations (collectively referred to as entity combinations 310). While only six entity combinations 310 (i.e., entity combination 310A through entity combination 310F) and three parameters (i.e., parameter 312 through parameter 316) are included in FIG. 3, the ellipses 310G and the ellipses 318 represent that there may be any number of entity combinations 310 having any number of associated parameters. However, such a table may typically have thousands (or more) of entity combinations and potentially hundreds of parameters.

Each entity combination may be further stored in the column 310 as any appropriate data type (e.g., a string, a vector, and so forth) of parseable entity combinations such that entities within a given entity combination can be parsed and individually identified. As such, each entity within an entity combination may be individually parseable and filterable, such that the table may be parsed and filtered with respect to any given entity included within any of the entity combinations of the table 300. For instance, within the entity combination "A, B, C", each of entities "A", "B", and "C" may be individually parseable and filterable. In an example, the data organization engine may store each entity combination as a parseable string of entities. Accordingly, to filter the entity combinations upon request (e.g. a user's request to determine the most popular entity combinations that include either entity A or B), the data parsing engine 224 may parse the entity combination strings, subsequently splitting the combination strings into vectors (e.g., entity combination string "A,B,C" is split into three entity vectors ["A", "B", "C"]). Upon parsing/splitting the entity combinations into individual entities, the data parsing engine 224 may identify the existence of the requested entities within the parsed entity combinations.

In a more particular example, upon receiving a request to filter for the entity "A" within the table 300, the data parsing engine 224 may parse and filter the table for all occurrences of the entity "A". Accordingly, in such an example, the data parsing engine may identify entity "A" as being included within the combinations "A", "A, B", "A, C", "A, B, C", and "A, B, C, D". Such parsing and/or filtering may also include an identification of each of the parameters associated with the parsed/filtered entities (or combinations of entities), as further described herein.

Storing each entity combination 214 as parseable entity combinations (e.g., strings, vectors, and so forth) as described herein, allows for using only one column that includes each entity combination rather than potentially hundreds of columns required to include every service/combination. Additionally, in some embodiments, only entity combinations that are used in practice are stored such that combinations that are possible, but don't exist in practice, are not stored (e.g., if entity combination "A, B" is possible, but is not actually used, the combination "A, B" is not stored in the table). Accordingly, storing in such a manner is a great improvement upon traditional methods with respect to storage efficiency. Such storage efficiency also allows the graph to be extremely scalable, as each additional combination of services requires adding only one row to the graph. Furthermore, despite having to parse entity combinations to identify a particular entity included within a number of given combinations, traversing the table may still be performed relatively quickly as the table is much smaller than traditional methods.

FIG. 4 illustrates a specific example of organizing the data 215 into a table 400, wherein the data 215 comprises data associated with cloud computer services, as described herein. As illustrated, the table 400 includes each service combination (i.e., service combination 410A through 410F stored in a single column 410, as well as a single column for each service combination parameter (i.e., parameter 412 through parameter 416) associated with the service combinations. While only six service combinations (i.e., service combination 410A through entity combination 410F) and three service combination parameters (i.e., parameter 312 through parameter 316) are included in FIG. 4, the ellipses 410G and the ellipses 418 represent that there may be any number of service combinations having any number of associated service combination parameters.

As described herein, each service (e.g., virtual machines) of each service combination (service combination 410A through service combination 410F) may be further stored in the column 410 as any appropriate data type (e.g., a string, a vector, and so forth) that can be parsed and individually identified. For instance, each service (i.e., virtual machines, storage, and backup) of the service combination 410E may be individually parseable and filterable. As such, upon receiving a request to filter for the virtual machines service within the table 400, the data parsing engine 224 may parse and filter the table for all occurrences of the virtual machines service. Accordingly, in such an example, the data parsing engine may identify the virtual machines service as being included within the service combination 410A, the service combination 410B, the service combination 410C, the service combination 410E, and the service combination 410F. Such parsing and/or filtering may also include an identification of each of the parameters associated with the parsed/filtered services (or service combinations), as further described herein. For instance, in the previous example, the trial conversion rate 412, the upgrade 414, and the churn rate 416 associated with the identified service combinations may also be identified.

Alternatively, such a table may be stored as a graph database or a matrix/table having one column for each possible entity (e.g., each possible service), along with a column for each of the associated parameters. For example, assume that a table is to be created that includes 20 entities and 60 parameters associated with those entities. Using the traditional large table having one column for each possible entity, 20 columns would be created for each of the entities and another 60 for each of the parameters. Generally, a 1 or a 0 would then be placed in the table for each row in which a given entity was present in an entity combination, as well as an appropriate value for each applicable parameter. In a more specific example using 20 entities, an entity combination of entities "A, B, C" would include a 1 in each of column "A", column "B", and column "C", while a 0 would be placed in each of the other 17 columns representing the other 17 entities. Furthermore, an additional 60 columns would also be created for each of the parameters associated with the entity combinations.

While storing all entity combinations as parseable entity combinations in one column of a table (i.e., the table 300 and the table 400) may provide a great benefit with respect to storing the table (i.e., such a table is much smaller, more efficient, and easier to store than a table having a column for each possible entity), other technical problems may be present. For instance, parsing individual entities (or sets of entities) within the table, traversing/searching the table, and building a response to a query of the table may be both time consuming and resource intensive. For example, assume a user has made a request to view particular parameters corresponding to each entity combination that includes at least entity "A". Also, assume that there are 20,000 entity combinations included within the table. The data parsing engine 224 of the computer system 200 (e.g., the data) would respond by parsing each of the 20,000 entity combinations included within the table to determine whether each given combination includes the entity "A". Such parsing (e.g., the parsing of 20,000 entity combinations to determine each entity combination that includes one or more particular entities) may demand a large amount of resources of the computer system 200, and may further demand those resources for an extended period of time.

As such, a separate table that links entity combinations may be generated as a technical solution to such technical problems. For instance, each entity combination 214 may be identified by the node linking engine 226 of the data analytics engine 220 as a node of a directed acyclic graph. As such each entity combination node may be linked to a nearest neighbor entity combination node. A nearest neighbor node of a given entity combination node may generally comprise a node that includes either one less or one more entity than the entity combination of the given node. Alternatively, in some embodiments, a nearest neighbor node of a given node may comprise a node that includes at least two more entities, or at least two less entities, than the given node, as further described herein. As briefly mentioned, generating such a table of linked nearest node entity combinations may overcome technical challenges associated with traversing a table that stores each entity combination as a parseable entity combination in one column of a table (i.e., the table 300 and the table 400).

For instance, again assume that a user has made a request to view particular parameters corresponding to each entity combination that includes at least entity "A". Also, assume that there are 20,000 entity combinations included within the table. Using both tables described herein (i.e., the table having one column that includes all entity combinations and the table of linked nearest neighbor entity combinations), the data parsing engine 224 of the computer system 200 may respond by parsing the simplest entity combinations (i.e., the entity combinations having the least number of entities) until the data parsing engine has identified an entity combination that includes at least the entity "A" (an entity combination solely including the entity "A" may be the first entity combination parsed).

Once the data parsing engine has identified the simplest entity combination that includes the entity "A", the data parsing engine may then identify the entity combination node within the nearest neighbor node graph that corresponds to the identified entity combination that includes the entity "A". From the identified entity combination node (i.e., the node that corresponds to the identified entity combination that includes the entity "A"), the data parsing engine may also identify each nearest neighbor entity combination of the identified entity combination, each nearest neighbor of each identified nearest neighbor, and so forth, until all entity combinations that include at least the entity "A" have been identified by the parsing engine. The user interface engine 228 may then display results associated with each of the entity combinations that include at least entity "A" and parameters corresponding to each of the entity combinations.

Accordingly, using both tables, numerous technical benefits may be achieved. For instance, the computer system 200 may parse relatively few entity combinations (perhaps as few as one) rather than parsing each entity combination (e.g., 20,000 entity combinations). Once an entity combination that includes a relevant entity (e.g., one requested by a user) has been identified by the computer system 200, the computer system may then use the table of linked nearest neighbors to quickly determine all entity combinations that include at least the relevant entity. Additionally, as one of skill in the art may appreciate, parsing relatively few entity combinations, followed by identifying nearest neighbors (possibly both upstream and downstream) may be much less resource intensive and much more efficient than parsing each entity combination included within a table to determine which entity combinations include a relevant entity (or set of entities). As such, generating the table of linked nearest neighbor nodes may thus allow the computer system to use few computing resources, while filtering, traversing, and searching the table to identify all relevant entities (or sets of entities) both quickly and efficiently.

Notably, while implementing such a table of nearest neighbor nodes is described with respect a first table that includes a single column that includes each entity combination as a parseable entity combination (i.e., with each entity combination in a separate row), the nearest neighbor node table may also be used with respect to a table that includes a separate row for each possible entity, as described herein. Particular examples of implementing such a table of nearest neighbor nodes are further described with respect to FIG. 5 and FIG. 6.

FIG. 5 illustrates an example directed acyclic graph comprising links or relationships (i.e., nearest neighbor nodes) between nodes of entity combinations (i.e., entity combination nodes 510A through 550A). As shown, a nearest neighbor node of an entity combination node 520B that includes entities "A, B" may include entity combination node 510A (i.e., entity combination "A"), entity combination node 510B (i.e., entity combination "B"), entity combination node 530A (i.e., entity combination "A, B, C"), entity combination node 530B (i.e., entity combination "A, B, D"), and so forth.

However, in some embodiments, a nearest neighbor node of a given entity combination node may include less than one less entity, or more than one more entity, than the entity combination of the given node (e.g., in circumstances where a node that includes one less or one more entity than a given node does not exist). For instance, entity combination node 550A (i.e., the entity combination "A, B, C, D, E, F") may be a nearest neighbor node of the node 540A (i.e., the entity combination "A, B, C, D"), despite the entity combination node 550A including more than one more entity (i.e., both entities "E" and "F") than the node 540A. Such an instance may have occurred because there is no entity combination node that includes either "A, B, C, D, E" or "A, B, C, D, F" (e.g., no entity combinations 214 were identified that include either entity combination "A, B, C, D, E" or entity combination "A, B, C, D, F").

FIG. 6 illustrates an exemplary implementation of a directed acyclic graph, as described herein. As shown in FIG. 6, the directed acyclic graph may be stored as two columns (i.e., column 610 and column 620) of a table 600 that is linked to the entity combinations 310A through 310F of table 300 (or the service combinations 410A through 410F of the table 400). While only seven rows of nodes (i.e., row 610A through row 610G) are shown within the table 600, the ellipses 610H represent that there may be any number of rows linking any number of entity combination nodes to other entity combination nodes.

Accordingly, "Node A" of the table 600 (i.e., column 610 and row 610A; column 610 and row 610B) may be linked by the node linking engine to the entity combination "A" of the table 300 (i.e., column 310 and row 310A), "Node A, B" of the table 600 (i.e., column 620 and row 610A; column 620 and row 610C; column 610 and row 610E; column 610 and row 610F) may be linked to the entity combination "A, B" of the table 300 (i.e., column 310 and row 310B), and so forth. The two columns (i.e., column 610 and column 620) of the table 600 may then comprise a linking of each given node (i.e., each entity combination 214) of the table 300 (or the table 400) to the nearest neighbor(s) of the given node. For instance, "Node A" (i.e., entity combination 310A in the table 300) may be linked to two nearest neighbors in both "Node A, B" (i.e., entity combination 310B in the table 300) and "Node A, C" (i.e., entity combination 310C in the table 300), as illustrated by the arrow 612A and the arrow 612B, respectively. Accordingly, as illustrated by the arrows (i.e., arrow 612A through arrow 612G), each given entity combination node (i.e., entity combination 310A through entity combination 310F of the table 300) may be linked to the given entity combination node's nearest neighbor nodes.

While such a directed acyclic graph has been described as being stored in a table having two columns, the directed acyclic graph described herein may be stored and/or implemented in any number of other ways. Accordingly, the specific implementation illustrated in FIG. 6 is used only for example purposes and is not meant to limit or narrow the principles described herein. Regardless of the way in which the two tables or graphs (i.e., both the table of entity combinations and corresponding parameters—e.g., the table 300, as well as the table that links nodes of entity combinations—e.g., the directed acyclic graph 500) are implemented, linking nodes of entity combinations (e.g., as illustrated in FIGS. 5 and 6), may allow tables/graphs of entity combinations and corresponding parameters (e.g., as illustrated in FIGS. 3 and 4) to be parsed, traversed, and filtered both quickly and efficiently.

For instance, a user may request to see one or more particular parameters associated with each entity combination that includes at least entity "A". As such, the data parsing engine may begin to parse the entity combinations to identify an entity combination that includes the entity "A". Upon traversing the table 300, for example, the data parsing engine may quickly identify the entity "A" within the entity combination 310A (i.e., entity combination "A"). Accordingly, in some embodiments, the data parsing engine may begin parsing at the simplest entity combinations (i.e., the entity combinations that include the fewest entities). The data parsing engine may then quickly traverse the table 600 that includes the nearest neighbor nodes of entity combination "A", as well as the nearest neighbor nodes of the nearest neighbor nodes of the entity combination "A", and so forth, to quickly identify each entity combination that includes at least the entity combination "A". Upon identifying each entity combination that includes at least the entity combination "A", each such entity combination and the one or more particular parameters corresponding to each such entity combination may be displayed to the user by the user interface engine.

In another example, a user may request to see one or more particular parameters associated with each entity combination that includes at least the combination of entity "A" and entity "B". As such, the data parsing engine may begin to parse the entity combinations to identify an entity combination that includes the combination of both entity "A" and the entity "B". Upon traversing the table 300, for example, the data parsing engine may quickly identify the combination of the entity "A" and the entity "B" within the entity combination 310B (i.e., entity combination "A, B"). The data parsing engine may then quickly traverse the table 600 that includes the nearest neighbor nodes of entity combination "A, B", as well as the nearest neighbor nodes of the nearest neighbor nodes of the entity combination "A, B", and so forth, to quickly identify each entity combination that includes at least the entity combination "A, B". Upon identifying each entity combination that includes at least the combination of the entity "A" and the entity "B", each such entity combination and the one or more particular parameters corresponding to each such entity combination may be displayed to the user by the user interface engine.

In a more specific example, a user may request to see the upgrade rate 414 corresponding to each service combination that includes at least the service "Backup". As such, the data parsing engine may begin to parse the service combinations to identify a service combination that includes the service "Backup". Upon traversing the table 400, for example, the data parsing engine may quickly identify the service "Backup" within the service combination 410C (i.e., service combination "Virtual Machines, Backup"). The data parsing engine may then quickly traverse a directed acyclic graph (e.g., the table 600) corresponding to the table 400 that includes the nearest neighbor nodes of the service combination "Virtual Machines, Backup", as well as the nearest neighbor nodes of the nearest neighbor nodes of the service combination "Virtual Machines, Backup", and so forth, to quickly identify each service combination that includes at least the service "Backup".

Upon identifying each service combination that includes at least the service "Backup", each such service combination and the one or more particular parameters corresponding to each such service combination may be displayed to the user by the user interface engine. Accordingly, the user interface engine may display an upgrade rate of 9% associated with the service combination "Virtual Machines, Backup" (i.e., service combination 410C), an upgrade rate of 3% associated with the service combination "Storage, Backup" (i.e., service combination 410D), an upgrade rate of 4% associated with the service combination "Virtual Machines, Storage, Backup" (i.e., service combination 410E, and an upgrade rate of 5% associated with the service combination "Virtual Machines, Storage, Backup, Virtual Network" (i.e., service combination 410F). As such, each entity combination that includes at least the requested entities (e.g., "Backup") within the table 400 that includes at least the service "Backup").

Accordingly, without the directed acyclic graph (e.g., the graph 500 and the table 600), filtering and traversing a table that includes entity combinations and parameters corresponding to the entity combinations (e.g., the table 300 and the table 400) may be relatively slow and arduous. For instance, in such circumstances, when a user requests to see one or more particular parameters corresponding to each entity combination that includes at least a particular entity (or at least a combination of entities), the data parsing engine would have to individually parse each entity combination within the table to determine which entity combinations include at least the particular entity.

Conversely, by using a directed acyclic graph as described herein, once an entity combination that includes at least the particular entity has been parsed and identified, nearest neighbor nodes of the identified entity combination node may be used to identify all other entity combinations that include at least the particular entity. Notably, the data parsing engine may begin parsing at the simplest entity combinations (i.e., the entity combinations having the fewest entities) in order to quickly identify a relevant entity or entity combination (e.g., the entity or entities regarding which a user has requested information), which can then be used with respect to the directed acyclic graph to identify nearest neighbor nodes and ultimately all entity combinations that include the relevant entity or combination of entities.

As such, regardless of the way in which the two tables or graphs (i.e., both the table of entity combinations and corresponding parameters—e.g., the table 300, as well as the table that links nodes of entity combinations—e.g., the directed acyclic graph 500) are implemented, linking nodes of entity combinations (e.g., as illustrated in FIGS. 5 and 6) may allow tables/graphs of entity combinations and corresponding parameters (e.g., as illustrated in FIGS. 3 and 4) to be parsed, traversed, and filtered both quickly and efficiently. Furthermore, implementing such a directed acyclic graph (e.g., the graph 500 and the table 600) may greatly improve the speed and efficiency with which a table of entity combinations and parameters (e.g., the table 300 and the table 400) is traversed, parsed, and filtered, regardless of the size of the table of entity combinations and corresponding parameters. Such a directed acyclic graph may further allow for identifying or filtering nodes (e.g., nearest neighbor nodes) that are upstream or downstream with respect to a given node.

Returning to FIG. 2, the data analytics engine may also be capable of pre-computing all of the parameters associated with the table 300 (or the table 400) such that when a user or computer system queries the table, the data analytics engine does not have to compute all of the parameters at runtime (i.e., the data analytics engine does not need to compute the parameters on the fly each time a request is received). Doing so may additionally allow for faster response times to queries, as less computations and less resources to perform those computations are required.

Figure 7:
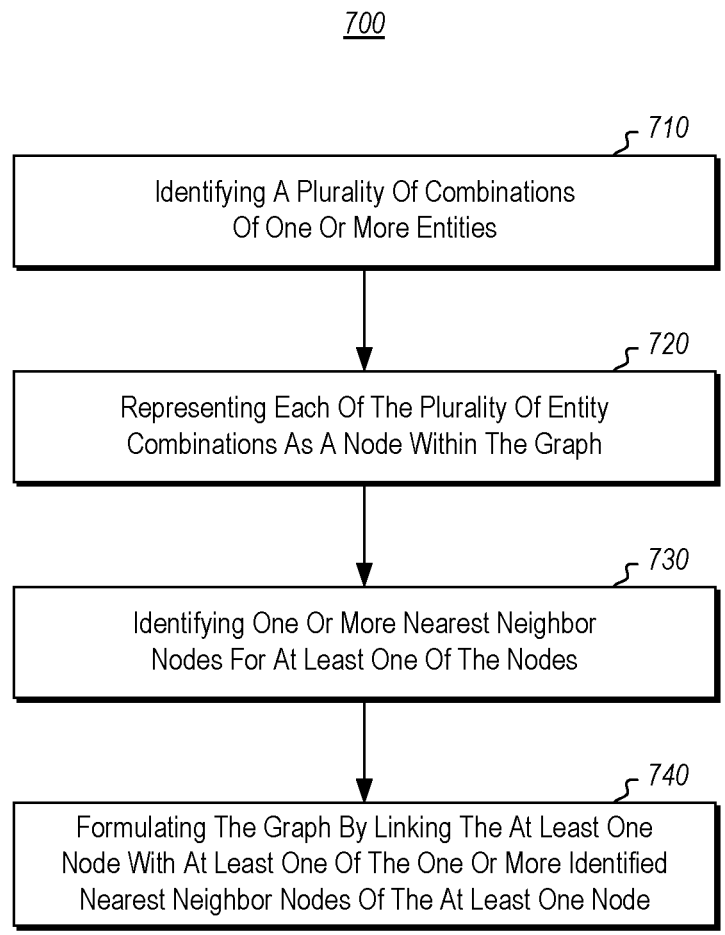
FIG. 7 illustrates a flowchart of a method for generating a graph of interconnected nodes.

FIG. 7 illustrates a flowchart of a method 700 for generating a graph of interconnected nodes. Description of the method 700 includes frequent reference to FIGS. 2 through 6. The method may include identifying a plurality of combinations of one or more entities (Act 710). For example, the data gathering engine 210 may identify entities 212. Furthermore, the data gathering engine may identify entity combinations 214 and parameters 216 associated with the identified entity combinations. The method may further include representing each of the plurality of entity combinations as a node within the graph (Act 720). For example, referring to FIGS. 3 and 6, each entity combination within the table 300 (i.e., entity combination 310A through entity combination 310F) may be stored or represented as nodes (i.e., "Node A", "Node B", and so forth) within the table 600.

The method 700 may further include identifying one or more nearest neighbor nodes for at least one of the nodes (Act 730). For instance, with respect to the FIG. 6, each node within the column 620 has been identified as a nearest neighbor node of a corresponding node in column 610. Additionally, each nearest neighbor node of a particular node may comprise a node that includes at least one entity that is common between the particular node and the nearest neighbor node. For instance, the nearest neighbor nodes of the "Node A" include both "Node A, B" and "Node A, C" (i.e., each nearest neighbor node of the "Node A" includes at least entity "A"). The method may further include formulating the graph by linking the at least one node with at least one of the one or more identified nearest neighbor nodes of the at least one node (Act 740). For instance, with respect to the FIG. 6, each node within the column 610 is linked to a nearest neighbor node included within the column 620.

In this way, each entity combination may be stored as any appropriate data type (e.g., a string, a vector, and so forth) of parseable entity combinations such that entities within a given entity combination can be parsed and individually identified. Storing each entity combination in such a manner may allow for using only one column that includes each entity combination rather than potentially hundreds of columns required to include every service/combination. Additionally, only entity combinations that are used in practice may be stored such that combinations that are possible, but don't exist in practice, are not stored (e.g., if entity combination "A, B" is possible, but is not actually used, the combination "A, B" is not stored in the table).

Furthermore, by using a directed acyclic graph as described herein, once an entity combination that includes at least the particular entity has been parsed and identified, nearest neighbor nodes of the identified entity combination node may be used to identify all other entity combinations that include at least the particular entity. Notably, parsing of entity combinations may begin at the simplest entity combinations (i.e., the entity combinations having the fewest entities) in order to quickly identify a relevant entity or entity combination (e.g., the entity or entities regarding which a user has requested information), which can then be used with respect to the directed acyclic graph to identify nearest neighbor nodes and ultimately all entity combinations that include a relevant entity or combination of entities.

As such, regardless of the way in which the two tables or graphs (i.e., both the table of entity combinations and corresponding parameters e.g., the table 300, as well as the table that links nodes of entity combinations e.g., the directed acyclic graph 500) are implemented, linking nodes of entity combinations (e.g., as illustrated in FIGS. 5 and 6) may allow tables/graphs of entity combinations and corresponding parameters (e.g., as illustrated in FIGS. 3 and 4) to be parsed, traversed, and filtered both quickly and efficiently. Furthermore, implementing such a directed acyclic graph (e.g., the graph 500 and the table 600) may greatly improve the speed and efficiency with which a table of entity combinations and parameters (e.g., the table 300 and the table 400) is traversed, parsed, and filtered, regardless of the size of the table of entity combinations and corresponding parameters.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
   one or more processors; and
   one or more computer-readable storage media having stored thereon computer-executable instructions that are executable by the one or more processors to cause the computer system to generate a graph of interconnected nodes, the computer-executable instructions including instructions that are executable to cause the computer system to perform at least the following:
   identify a plurality of combinations of one or more entities, each of the plurality of combinations of one or more entities being a finite list of one or more discretely labeled entities;
   represent each of the plurality of entity combinations as a node within the graph;
   for each of the plurality of nodes, identify a set of nearest neighbor nodes for the each node, the set of nearest neighbor nodes of a particular node including
      each node of the plurality of nodes that includes all but one of the list of one or more discretely labeled entities of the particular node and
      each node of the plurality of nodes that includes all of the list of one or more discretely labeled entities of the particular node plus one more entity not included in the entities of the particular node; and
   generate the graph by linking each node of the plurality of nodes with each node of the set of identified nearest neighbor nodes of the each node of the plurality of nodes.

2. The computer system in accordance with claim 1, wherein one or more entity combinations of the plurality of identified entity combinations comprise a combination of one or more entities that have been identified as being used together.

3. The computer system in accordance with claim 1, wherein the plurality of combinations of one or more entities comprise a plurality of combinations of one or more cloud computer services.

4. The computer system in accordance with claim 1, wherein at least one of the one or more identified nearest neighbor nodes of a particular node comprises a node that includes exactly one more entity or exactly one less entity than the particular node.

5. The computer system in accordance with claim 1, wherein each of the one or more identified nearest neighbor nodes of a particular node comprises a node that includes exactly one more entity or exactly one less entity than the particular node.

6. The computer system in accordance with claim 1, wherein each of the plurality of identified combinations of one or more entities are also stored in a separate table that is different from the graph of interconnected nodes.

7. The computer system in accordance with claim 6, wherein one or more parameters associated with each of the plurality of identified combinations of one or more entities are also stored in the separate table.

8. The computer system in accordance with claim 6, wherein each of the plurality of identified combinations of one or more entities are stored in the separate table as a parseable combination such that each entity within a combination of one or more entities is separately identifiable.

9. The computer system in accordance with claim 8, wherein the computer executable instructions further include instructions that are executable to cause the computer system to perform at least the following:
   in response to receiving a request to filter the plurality of entity combinations for each entity combination that includes at least a particular entity, perform at least the following:
      parsing each entity combination stored within the separate table until the particular entity is identified within a particular entity combination, wherein parsing each entity combination comprises beginning the parsing at the entity combination having the fewest number of entities;
      upon identifying the particular entity within the particular entity combination that is stored within the separate table, identifying a corresponding entity combination within the graph of interconnected nodes that is linked to the particular entity combination that is stored within the separate table; and
      identifying each nearest neighbor node of the identified corresponding entity combination within the graph of interconnected nodes to thereby identify each entity combination that includes at least the particular entity.

10. The computer system in accordance with claim 9, wherein each of the plurality of identified combinations of one or more entities being stored in the separate table as a parseable combination such that each entity within an entity combination is separately identifiable comprises storing each of the at least one entity combinations as a string.

11. A method, implemented at a computer system that includes one or more processors, for generating a graph of interconnected nodes, comprising:

identifying a plurality of combinations of one or more entities, each of the plurality of combinations of one or more entities being a finite list of one or more discretely labeled entities;

representing each of the plurality of entity combinations as a node within the graph;

for each of the plurality of nodes, identifying a set of nearest neighbor nodes for the each node, the set of nearest neighbor nodes of a particular node including
each node of the plurality of nodes that includes all but one of the list of one or more discretely labeled entities of the particular node and
each node of the plurality of nodes that includes all of the list of one or more discretely labeled entities of the particular node plus one more entity not included in the entities of the particular node; and generating the graph by linking each node of the plurality of nodes with each node of the set of identified nearest neighbor nodes of the each node of the plurality of nodes.

12. The method in accordance with claim 11, wherein one or more entity combinations of the plurality of identified entity combinations comprise a combination of one or more entities that have been identified as being used together.

13. The method in accordance with claim 11, wherein each of the plurality of identified entity combinations comprises a combination of one or more entities that have been identified as being used together.

14. The method in accordance with claim 11, wherein at least one of the one or more identified nearest neighbor nodes of a particular node comprises a node that includes exactly one more entity or exactly one less entity than the particular node.

15. The method in accordance with claim 11, wherein each of the one or more identified nearest neighbor nodes of a particular node comprises a node that includes exactly one more entity or exactly one less entity than the particular node.

16. The method in accordance with claim 11, wherein each of the plurality of identified combinations of one or more entities are also stored in a separate table that is different from the graph of interconnected nodes such that each given entity combination of the plurality of identified combinations of one or more entities are linked to a corresponding entity combination that both comprises a same combination of the given entity and is stored within the separate table.

17. The method in accordance with claim 16, wherein one or more parameters associated with each of the plurality of identified combinations of one or more entities are also stored in the separate table.

18. The method in accordance with claim 17, wherein each of the plurality of identified combinations of one or more entities are stored in the separate table as a parseable combination such that each entity within a combination of one or more entities is separately identifiable.

19. The method in accordance with claim 18, further comprising:

in response to receiving a request to filter the plurality of entity combinations for each entity combination that includes at least a particular entity, performing at least the following:
parsing each entity combination stored within the separate table until the particular entity is identified within a particular entity combination, wherein parsing each entity combination comprises beginning the parsing at the entity combination having the fewest number of entities;
upon identifying the particular entity within the particular entity combination that is stored within the separate table, identifying a corresponding entity combination within the graph of interconnected nodes that is linked to the particular entity combination that is stored within the separate table; and
identifying each nearest neighbor node of the identified corresponding entity combination within the graph of interconnected nodes to thereby identify each entity combination that includes at least the particular entity.

20. A computer program product comprising one or more computer readable data storage devices having stored thereon computer-executable instructions that are executable by one or more computer processors of a computer system to cause the system to perform steps for generating a graph of interconnected nodes, the steps comprising:

identifying a plurality of combinations of one or more entities, each of the plurality of combinations of one or more entities being a finite list of one or more discretely labeled entities;

representing each of the plurality of entity combinations as a node within the graph;

for each of the plurality of nodes, identifying a set of nearest neighbor nodes for the each node, the set of nearest neighbor nodes of a particular node including
each node of the plurality of nodes that includes all but one of the list of one or more discretely labeled entities of the particular node and
each node of the plurality of nodes that includes all of the list of one or more discretely labeled entities of the particular node plus one more entity not included in the entities of the particular node; and generating the graph by linking each node of the plurality of nodes with each node of the set of identified nearest neighbor nodes of the each node of the plurality of nodes.

* * * * *